United States Patent
Collins et al.

(10) Patent No.: US 6,790,023 B2
(45) Date of Patent: Sep. 14, 2004

(54) SCREW EXTRUDER AND METHOD OF CONTROLLING THE SAME

(75) Inventors: Thomas Robert Collins, Saratoga Springs, NY (US); Nelson R. Corby, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/828,032

(22) Filed: Apr. 5, 2001

(65) Prior Publication Data

US 2002/0146475 A1 Oct. 10, 2002

(51) Int. Cl.[7] .......................... B29C 47/92; B29C 47/38
(52) U.S. Cl. .................... 425/145; 425/204; 425/379.1; 425/461
(58) Field of Search ................................ 425/135, 145, 425/204, 379.1, 461; 366/79, 83–85, 601, 142

(56) References Cited

U.S. PATENT DOCUMENTS

| 3,728,056 A | * | 4/1973 | Theysohn ................... 425/135 |
| 4,500,481 A | * | 2/1985 | Marx, III ................ 264/171.14 |
| 4,671,908 A | * | 6/1987 | Gwinn et al. .............. 264/40.1 |
| 4,759,890 A | * | 7/1988 | Kroksnes ................... 264/40.1 |
| 5,149,193 A | * | 9/1992 | Faillace ...................... 264/349 |
| 5,804,111 A | * | 9/1998 | Kobayashi et al. ......... 264/102 |
| 6,186,765 B1 | * | 2/2001 | Ide et al. ................. 425/133.5 |
| 6,186,769 B1 | * | 2/2001 | Hawley ...................... 118/405 |

* cited by examiner

*Primary Examiner*—Nam Nguyen
*Assistant Examiner*—Brian L. Mutschler
(74) *Attorney, Agent, or Firm*—Pierce Atwood

(57) ABSTRACT

An extruder includes a barrel having a die attached to one end and at least one material inlet with a feeder for providing material to the material inlet. At least one screw is rotatively mounted in the barrel, and a motor is provided for driving the screw. A plurality of sensors is mounted in the barrel for sensing passage of screw thread edges as the screw rotates. A controller for controlling operation of the extruder receives signals from the sensors and determines local torsional deformations of the screw based on the signals. The controller slows down the extruder if any one of the local torsional deformations falls outside of an optimal range.

17 Claims, 4 Drawing Sheets

SCREW EXTRUDER AND METHOD OF CONTROLLING THE SAME

BACKGROUND OF THE INVENTION

This invention relates generally to screw extruders and more particularly to determining torsional deformations in screw extruders.

Thermoplastic resins are commonly formed using extrusion molding machines typically referred to as extruders. Both single screw and multi-screw extruders are known. For instance, a twin screw extruder includes a pair of intermeshing screws rotatively mounted within a close fitting casing or barrel. Raw material, typically in the form of powder or pellets, is fed into the interior of the barrel and is moved through the barrel by the rotating screws. The mechanical action of the screws, along with any heat that may be added, melts and mixes the raw materials. The heated and compressed material is forced out of a die at the discharge end of the barrel and assumes the desired shape.

Along the length of each screw, there are many different material regimes—solids, voids and liquids of varying viscosity. Because they are not perfectly rigid bodies, the extruder screws act like long torsion springs when encountering these varying material regimes. That is, the screws will experience angular twist or torsional deformation.

A major cause of customer rejection of extruded plastics is variations in viscosity of the finished product. Rejected material increases production costs and leads to dissatisfied customers. There are many factors that can effect viscosity, including the quality of the raw materials used, the amount of heated applied and the rotational speed of the screws. Monitoring the extrusion screw torque would allow better control of the process such that variations in viscosity could be reduced. However, merely measuring the torque at the drive motor will not provide optimal control of the extrusion process because of the torsional deformations along the length of the screws due to the above mentioned variations in the material regimes that the screws encounter.

Accordingly, it would be desirable to be able to continuously measure rotating extruder screw torsional deformations along the length of the screw. Knowledge of the varying torsional deformations allows for better control of the extrusion process leading to reduced viscosity variations in the finished product. Reducing variations in the finished product will increase yields, thereby reducing overall production costs.

BRIEF SUMMARY OF THE INVENTION

The above-mentioned need is met by the present invention, which provides an extruder having a barrel including a die attached to one end and at least one material inlet with a feeder for providing material to the material inlet. At least one screw is rotatively mounted in the barrel, and a motor is provided for driving the screw. A plurality of sensors is mounted in the barrel for sensing passage of screw thread edges as the screw rotates. A controller for controlling operation of the extruder receives signals from the sensors and determines local torsional deformations of the screw based on the signals. The controller slows down the extruder if any one of the local torsional deformations falls outside of an optimal range.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
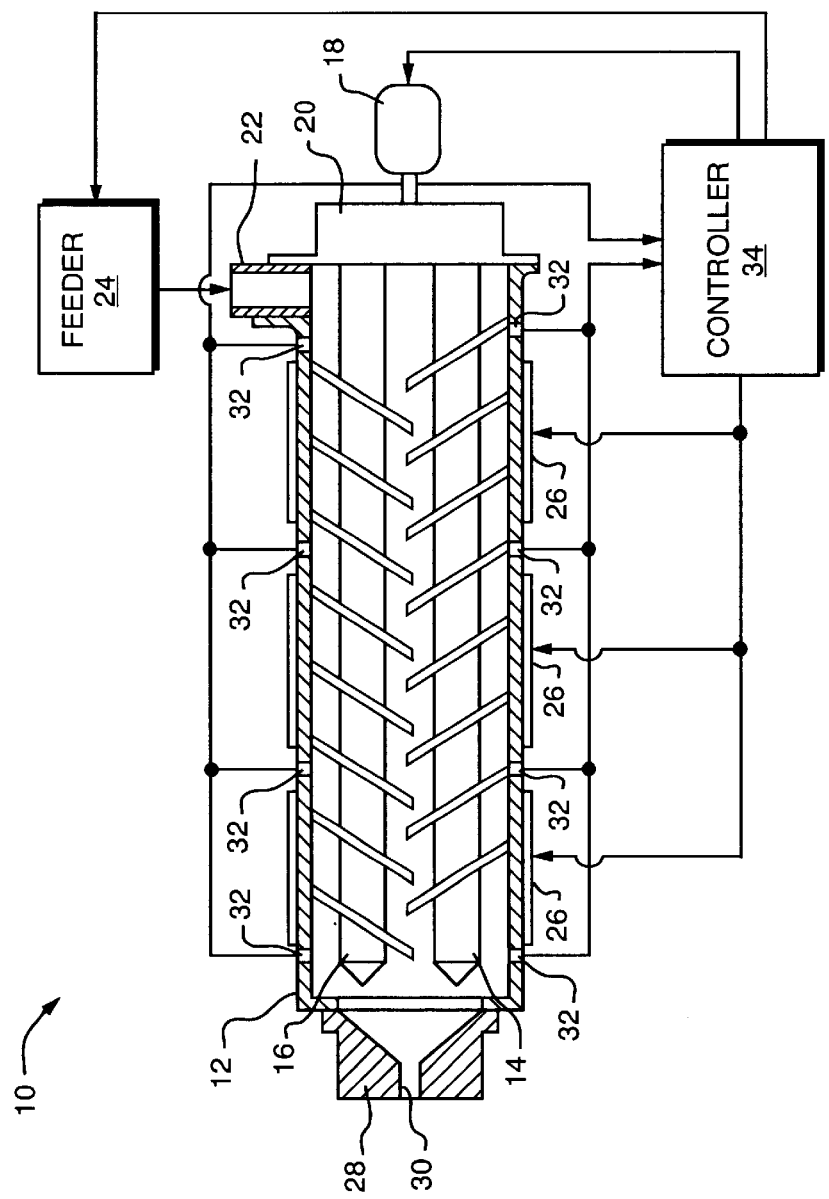
FIG. 1 is a cross-sectional view of one embodiment of a twin screw extruder.

Referring to the drawings wherein identical reference numerals denote the same elements throughout the various views, FIG. 1 shows an extrusion molding machine or extruder 10. The extruder 10 comprises a long, substantially cylindrical barrel 12 having an internal chamber. First and second intermeshing screws 14 and 16 are rotatively mounted in the chamber of the barrel 12. Each screw 14 and 16 is provided with one or more helical threads such that, when rotating, the screws 14 and 16 will convey raw materials through the barrel chamber. The mechanical action of the screws 14 and 16 will also heat and mix the raw materials. The pitch of the screw threads can vary along the length of the screws 14 and 16.

A motor 18 synchronously drives the screws 14 and 16 via a dual axle gearbox 20 that is mounted to a first end of the barrel 12. As is known in the art, the gearbox 20 contains a number of gears such that the rotational speed of the screws 14 and 16 can be controlled. An inlet opening 22 is formed in the barrel 12, typically near the first end thereof, for allowing raw materials to be extruded to be fed into the barrel chamber. Although only one such inlet opening is shown in FIG. 1, it should be noted that the barrel 12 could be provided with additional inlet openings located at various locations. A feeder 24 (shown schematically in FIG. 1) provides raw materials, typically in powder or pellet form, at a controlled feed rate to the inlet opening 22.

Heaters 26, such as electrical resistance heaters or the like, are optionally disposed around the outer surface of the barrel 12 for providing additional heating of the raw materials in the barrel chamber. A die 28 is mounted to the second end of the barrel 12 and has an outlet 30 through which the extruded material is discharged.

A plurality of sensors 32 is provided for sensing passage of screw thread edges as the screws 14 and 16 rotate such that the angular twist or torsional deformation of the screws 14 and 16 can be measured. In one embodiment, the sensors 32 are arranged in a first series mounted in the barrel 12 adjacent to the first screw 14 and a second series mounted in the barrel 12 adjacent to the second screw 16. The sensors 32 of the first series are spaced longitudinally along the length of the barrel 12 but at the same circumferential location on the barrel 12 so as to define a line that is parallel to the rotational axis of the first screw 14. Likewise, the sensors 32 of the second series are spaced longitudinally along the length of the barrel 12 but at the same circumferential location on the barrel 12 so as to define a line that is parallel to the rotational axis of the second screw 16.

The number and locations of the sensors 32 in each series can vary depending on a number of factors such as the length of the screws, the number of material inlets used, and the type of material being extruded among others. In one preferred embodiment, the sensors 32 are threaded into small holes formed in the barrel 12 at appropriate locations. Although other means of mounting the sensors 32 to the barrel 12 can be used, screwing the sensors 32 into the barrel wall maintains the seal-tight nature of the barrel 12. The sensors 32 can be placed at a number of locations, but are generally located at points along the length of the barrel 12 that correspond to screw locations at which it is desired to know the torsional deformation. Some possible sensor locations include near the first and second ends of the barrel. It is also useful to place sensors 32 at locations corresponding to locations in the barrel chamber where the material viscosity is likely to change, as material viscosity is a primary factor on the torsional deformation of the screws 14, 16. Accordingly, other likely sensor locations include spots immediately downstream of material inlets and heat input sources.

During operation of the extruder 10, the sensor 32 at any given sensor location would "see" the periodic passage of a screw edge, then a void, then a screw edge, then a void and so on. The frequency at which a screw edge passes the sensor 32 is determined by the screw pitch in the vicinity of the sensor 32 and the rotational speed of the screw. The sensors 32 can be any type of device capable of sensing passages of screw thread edges. This would include inductive, capacitive, eddy current, optical and sonic sensors, among others. In any case, when a screw edge passes a sensor 32, it will generate a signal indicating that the screw edge passage has been detected. The detection signal from each sensor 32 is fed to a controller 34 that controls the operation of the motor 18, the feeder 24 and the heaters 26.

Figure 2:
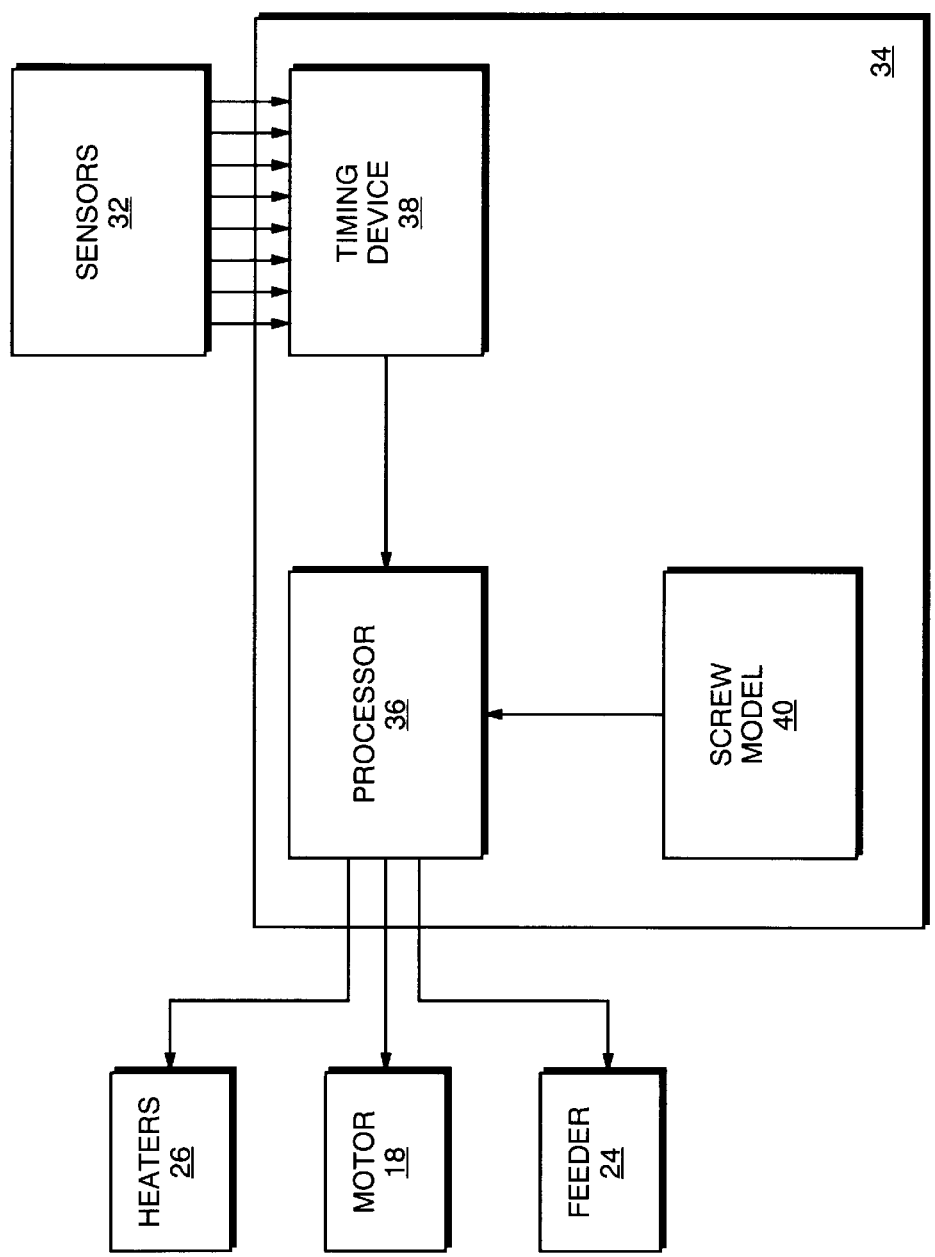
FIG. 2 is a schematic representation of the control scheme for the extruder of FIG. 1.

Referring now to FIG. 2, it is seen that the controller 34 comprises a processor 36, a timing device 38 such as a peak detector and a screw model 40. The detection signals from the sensors 32 (shown collectively in FIG. 2) are fed to the timing device 38, which notes the edge arrival times for each sensor 32. The screw model 40 is a geometric (i.e., radius, length and pitch) and material model of each screw 14, 16. The processor 36 receives inputs from the timing device 38 and the screw model 40 to compute local torsional deformations along the lengths of the two screws 14, 16. The processor 36 also outputs control signals to the motor 18, the feeder 24 and the heaters 26. Thus, if the torsional deformation at any point along the length of either screw 14, 16 goes out of optimal range, the processor 36 can slow down the extrusion process until screw torsional deformations at all locations return to optimal ranges. This can be accomplished by slowing down the feed rate of the feeder 24, slowing down the rotational speed of the screws 14, 16, reducing the heat input from the heaters 26, or any combination thereof.

Figure 4:
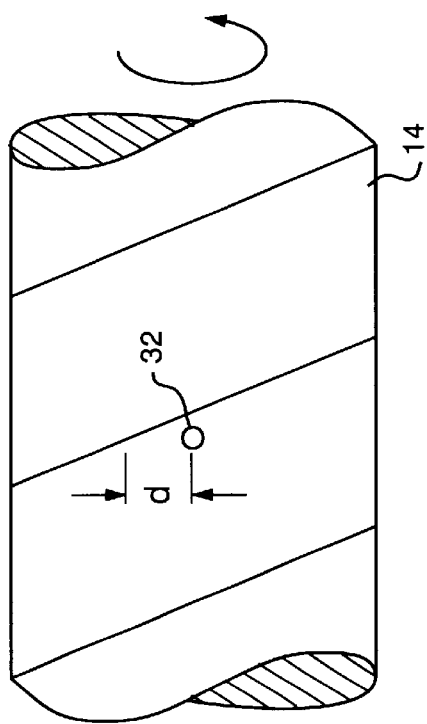
FIG. 4 is a side view of one of the extruder screws from the extruder of FIG. 1 rotating under a load.
Figure 3:
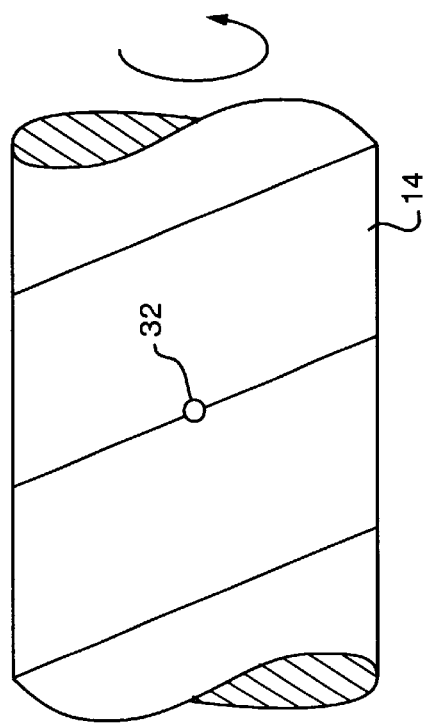
FIG. 3 is a side view of one of the extruder screws from the extruder of FIG. 1 rotating under no load.

The determination of the local torsional deformations is illustrated in FIGS. 3 and 4, which compare the first screw 14 under unloaded and loaded conditions. The same discussion also applies to the second screw 16 as well. FIG. 3 shows a portion of the first screw 14 in the vicinity of one of the sensors 32 while the screw 14 is operating with no load (i.e., with the barrel 12 empty). With no load, the screw 14 will not be twisted and the screw edge passes the sensor 32 at a nominal time, as shown in FIG. 3. FIG. 4 shows the same portion of the first screw 14 operating under a load having different material regimes such that varying torsional deformations occur along the length of the screw 14. In this instance, the load on the rotating screw 14 causes the screw 14 to be twisted in the direction opposite to the direction of rotation so that edge passage at the sensor 32 will be "late" with respect to the nominal time. In other words, the screw edge will not pass the sensor 32 at the nominal time, as shown in FIG. 4. Instead, the screw 14 must rotate a circumferential distance d before the screw edge passes the sensor 32. The difference between the time when the screw edge passes the sensor 32 and the nominal time is referred to herein as the time delay. It is also possible for the screw 14 to be twisted in the same direction as the direction of rotation, such as when a load is suddenly released in the vicinity of the sensor 32. In this case, the screw edge would pass the sensor 32 before the nominal time, resulting in a negative time delay.

A calibration run is conducted before normal operation by running the extruder 10 empty with no load on the screws 14, 16 so as to establish the nominal times for each one of the sensors 32. Then, the processor 36 is able to determine the time delays from the edge arrival times received from the timing device 38. The local torsional deformation at each sensor location is then determined from the detected time delay, the known screw rotational speed and the appropriate screw properties from the screw model 40.

Figure 5:
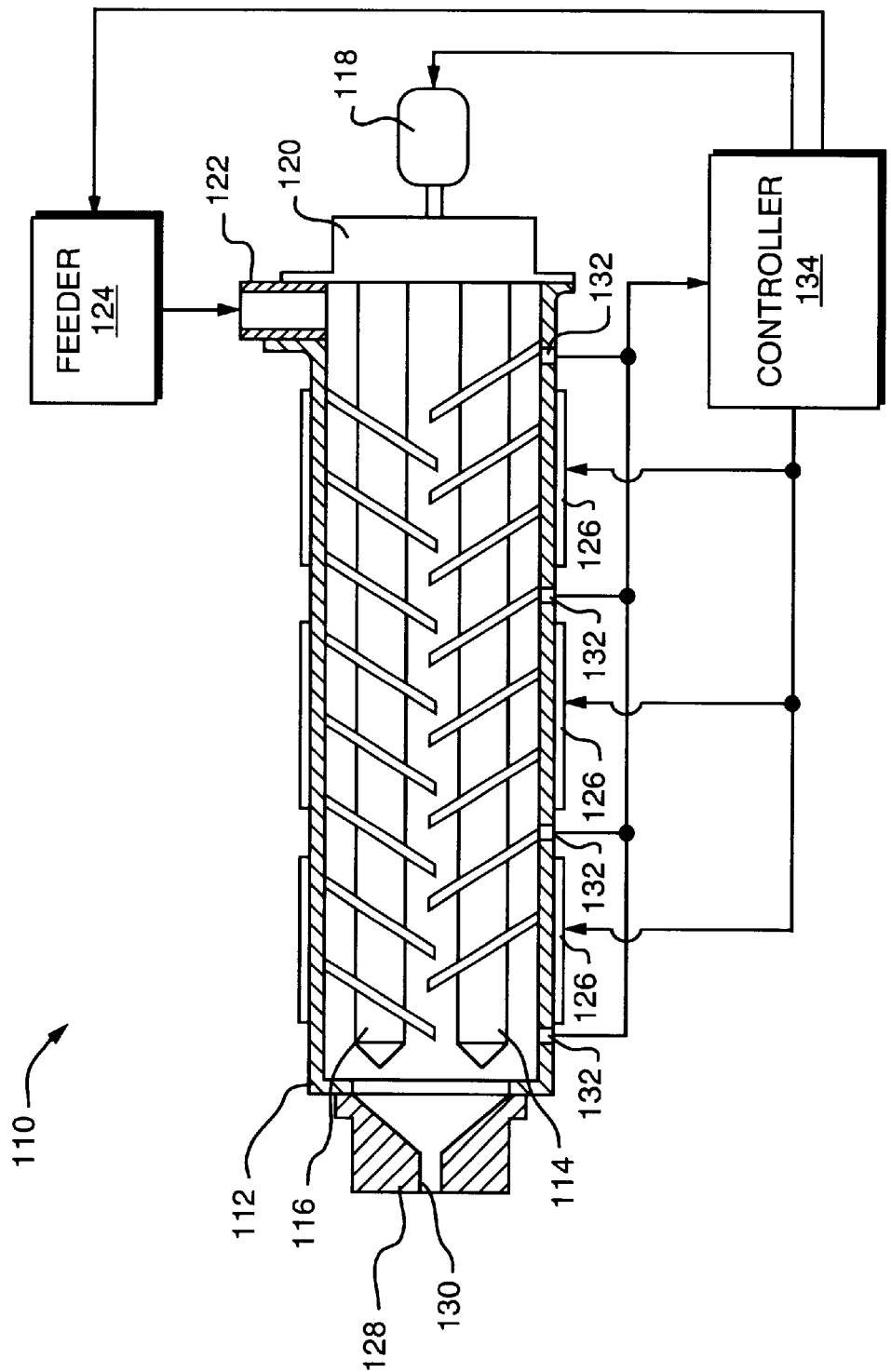
FIG. 5 is a cross-sectional view of an alternative embodiment of a twin screw extruder.

FIG. 5 shows an alternative embodiment of a twin screw extruder 110. This extruder 110 is substantially similar to the extruder of the first embodiment in that it has first and second intermeshing screws 114 and 116 rotatively mounted in the chamber of a barrel 112 and synchronously driven by a motor 118 via a gearbox 120. The extruder also includes an inlet opening 122, a feeder 124, heaters 126 and a die 128 that are the same as those described above in connection with the first embodiment. However, this extruder 110 differs from the first embodiment in that instead of having a series of sensors located adjacent to the first screw and a second series of sensors located adjacent to the second screw, it has only a single series of sensors 132 located adjacent to one of the screws. As shown in FIG. 5, the series of sensors 132 is located adjacent to the first screw 114, although it could alternatively be adjacent to second screw 116. The detection signal from each sensor 132 is fed to a controller 134 that controls the operation of the motor 118, the feeder 124 and the heaters 126. In this case, the local torsional deformations of the first screw 114 are determined in the same manner as that described above. The local torsional deformations for the second screw 116 are then estimated or assumed to be the same as the first screw local torsional deformations. Although the present invention has been described in the context of twin screw extruders, it should be appreciated that the present invention is not limited to twin screw extruders and can be implemented with other types of screw extruders including single screw extruders.

The foregoing has described an extruder capable of monitoring local torsional deformations of the screws and thereby providing better control of the extrusion process. While specific embodiments of the present invention have been described, it will be apparent to those skilled in the art that various modifications thereto can be made without departing from the spirit and scope of the invention as defined in the appended claims.

What is claimed is:

1. An extruder comprising:
   a barrel having a die attached to one end and at least one material inlet;

at least one screw rotatively mounted in said barrel;

a plurality of sensors mounted in said barrel for sensing passage of screw thread edges as said screw rotates; and means for determining local torsional deformations of said screw based on signals output by said sensors.

2. The extruder of claim 1 wherein said screw defines a rotational axis, and said sensors are spaced along said barrel so as to define a line that is parallel to said rotational axis.

3. The extruder of claim 1 wherein each sensor is threaded into a small hole formed in said barrel.

4. The extruder of claim 1 wherein at least one of said sensors is located immediately downstream of said material inlet.

5. The extruder of claim 1 further comprising a heater disposed around said barrel, and wherein at least one of said sensors is located immediately downstream of said heater.

6. The extruder of claim 1 wherein said means for determining local torsional deformations of said screw comprises a controller that controls rotation of said screw and receives signals from said sensors.

7. The extruder of claim 6 further comprising a second screw rotatively mounted in said barrel.

8. The extruder of claim 7 further comprising a second plurality of sensors mounted in said barrel for sensing passage of screw thread edges as said second screw rotates, said controller determining local torsional deformations of said second screw based on signals received from said second plurality of sensors.

9. The extruder of claim 7 wherein said controller estimates local torsional deformations of said second screw to be equal to said local torsional deformations of said at least one screw.

10. An extruder comprising:

a barrel having a die attached to one end and at least one material inlet;

a feeder for providing material to said material inlet;

at least one screw rotatively mounted in said barrel;

a motor for driving said screw;

a plurality of sensors mounted in said barrel for sensing passage of screw thread edges as said screw rotates; and a controller for controlling operation of said motor and said feeder, said controller receiving signals from said sensors and determining local torsional deformations of said screw based on said signals.

11. The extruder of claim 10 wherein said screw defines a rotational axis, and said sensors are spaced along said barrel so as to define a line that is parallel to said rotational axis.

12. The extruder of claim 10 wherein each sensor is threaded into a small hole formed in said barrel.

13. The extruder of claim 10 wherein at least one of said sensors is located immediately downstream of said material inlet.

14. The extruder of claim 10 further comprising a heater disposed around said barrel, and wherein at least one of said sensors is located immediately downstream of said heater.

15. The extruder of claim 10 further comprising a second screw rotatively mounted in said barrel.

16. The extruder of claim 15 further comprising a second plurality of sensors mounted in said barrel for sensing passage of screw thread edges as said second screw rotates, said controller determining local torsional deformations of said second screw based on signals received from said second plurality of sensors.

17. The extruder of claim 15 wherein said controller estimates local torsional deformations of said second screw to be equal to said local torsional deformations of said at least one screw.

* * * * *